Jan. 4, 1927.  1,613,520
P. A. D. MARTI
APPARATUS FOR RECORDING THE DURATION OF VERY BRIEF PHENOMENA
Filed July 24, 1923    2 Sheets-Sheet 1
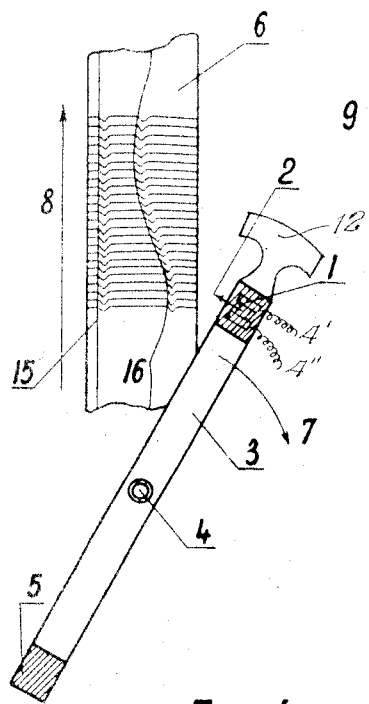
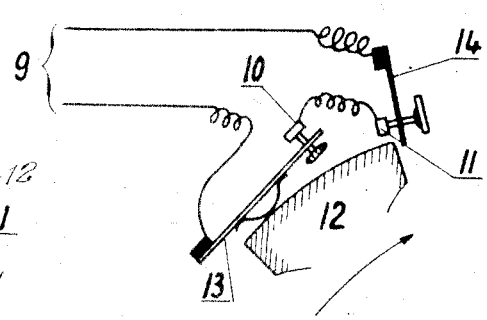
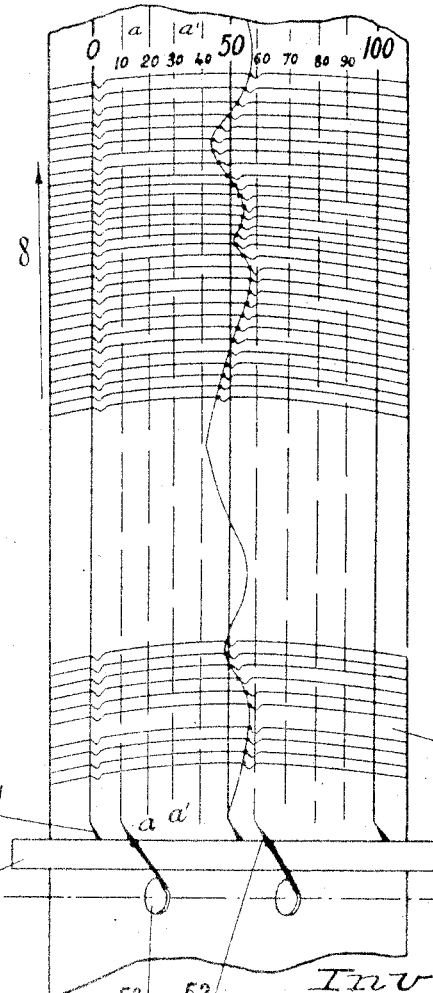
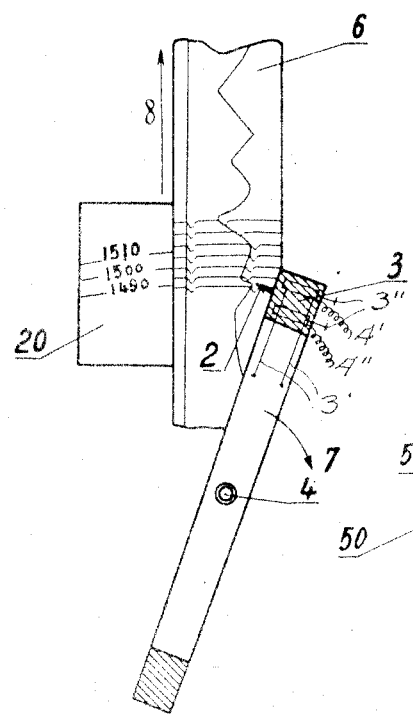
Inventor
P.A.D. Marti
By Marks & Clerk
Attys.

Jan. 4, 1927. 1,613,520
P. A. D. MARTI
APPARATUS FOR RECORDING THE DURATION OF VERY BRIEF PHENOMENA
Filed July 24, 1923   2 Sheets-Sheet 2

Inventor
P.A.D. Marti
By Marks & Clerk
Attys.

Patented Jan. 4, 1927.

1,613,520

UNITED STATES PATENT OFFICE.

PIERRE AUGUSTE DANIEL MARTI, OF PHILIPPEVILLE, ALGERIA.

APPARATUS FOR RECORDING THE DURATION OF VERY BRIEF PHENOMENA.

Application filed July 24, 1923, Serial No. 653,557, and in France September 7, 1922.

The measurement of the duration of a very brief phenomenon is generally made by means of recording apparatus comprising a tracing point, usually actuated by electric current set up at the beginning and the end of the phenomenon, said point being mounted on a stationary member; the said point bears upon a rotating cylinder which is generally covered with smoked paper and is mounted upon a screw in coaxial position, so that the point of contact of the said tracing point when in the inoperative position will describe upon the cylinder a regular helical line on which indentations are formed by the movements of the tracing point caused by the currents produced by the beginning and end of the phenomenon. When it is required to record in a repeated manner the duration of phenomena which are periodically reproduced, (as is the case in continuous sounding in the sea by means of sound, in which operation it is necessary to measure at regular intervals the duration of the very short time which elapses between the emission of a noise and the reception of the same noise reflected from the sea bottom), the apparatus of the above-mentioned type are not susceptible of practical applications, since they indicate the result in a form which is inconvenient to read, thereby obliging the observer to stop the apparatus so as to examine the graphic chart and to make measurements of time thereupon.

The present invention has for its object a recording apparatus operating continuously and showing a great sensitiveness wherein this drawback is obviated. Accordingly the tracing point and the electromagnet actuating the same are displaced rapidly at a constant and known speed before the paper which is practically stationary. The same result may be obtained if the tracing point only is displaced, the electromagnet itself remaining stationary and actuating the displaceable tracing point by a suitable gearing. For example the electromagnet can be mounted on an equilibrated pivoting arm rotating at a constant high speed which passes periodically before a paper band which is caused to travel at a slow speed. In order that the record shall be made, the phenomenon must be produced during the time in which the oscillograph travels before the paper band. To this effect, the starting of the phenomenon is ensured by the rotation of the rotating arm carrying the oscillograph, at the moment when the tracing point attains the edge of the paper band. At each passage before the band, the tracing point inscribes thereon a curve approaching an arc upon which are formed two indentations whereof the first corresponds to the beginning of the phenomenon and the second to the end of the same. During the next passage of the oscillograph, the paper band has now slightly moved forward, and the point will trace another curve which is parallel with the first and which also has two indentations whose spacing gives a measurement of the duration of the succeeding phenomenon. One thus obtains a set of lines upon which all the indentations representing the start of the phenomenon are situated upon a common straight line parallel to the edge of the band, whilst the indentations at the end of the phenomenon are situated at variable distances from this straight line, according to the variable duration of the phenomenon measured, and therefore immediately forming the curve which represents (in proportion to the time) the variable duration of the phenomenon measured.

Various detail arrangements will be further described whereby the said apparatus is made exact as well as practical.

In the case in which the said continuous recording apparatus is employed for continuous sounding by means of sound, it may be actuated by any source of acoustic waves which can be set in operation at will.

The acoustic source may be for example an ultrasonorous apparatus of the Langevin type wherein the sonorous vibrations of high frequency termed ultra-sonorous waves are emitted by a quartz crystal in which the potential of the opposite faces is made to vary with great rapidity. The electromagnet mounted upon the recording apparatus is for example of the Abraham type; it is actuated by an amplifying device connected with the quartz.

The following description and the appended drawings which are given by way of example represent a recording apparatus of great sensitiveness which is intended for continuous sounding by means of sound.

Fig. 1 shows the said electromagnet mounted upon a rotating arm, and also the record band.

Fig. 2 represents a special type of contact utilized in the case of continuous sea sounding by means of sound, for starting the phenomenon.

Fig. 3 represents a graphic chart obtained with the recording apparatus showing the arcs described by the recording point and their indentations, and showing a series of graduations inscribed by a special device upon the record band, as well as the record of the indications corresponding to the time.

Fig. 4 represents a device for carrying out the regulation with reference to the scale inscribed upon the record band.

Figure 5:
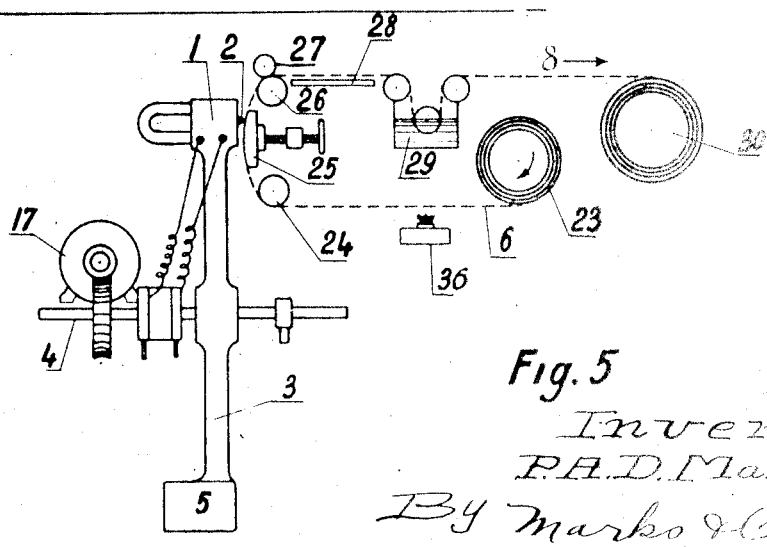

Fig. 5 is a side view of the whole apparatus showing a record band coated with lampblack together with the elements providing for its travelling motion, for smoking the band, and for fixing the record.

Figure 6:
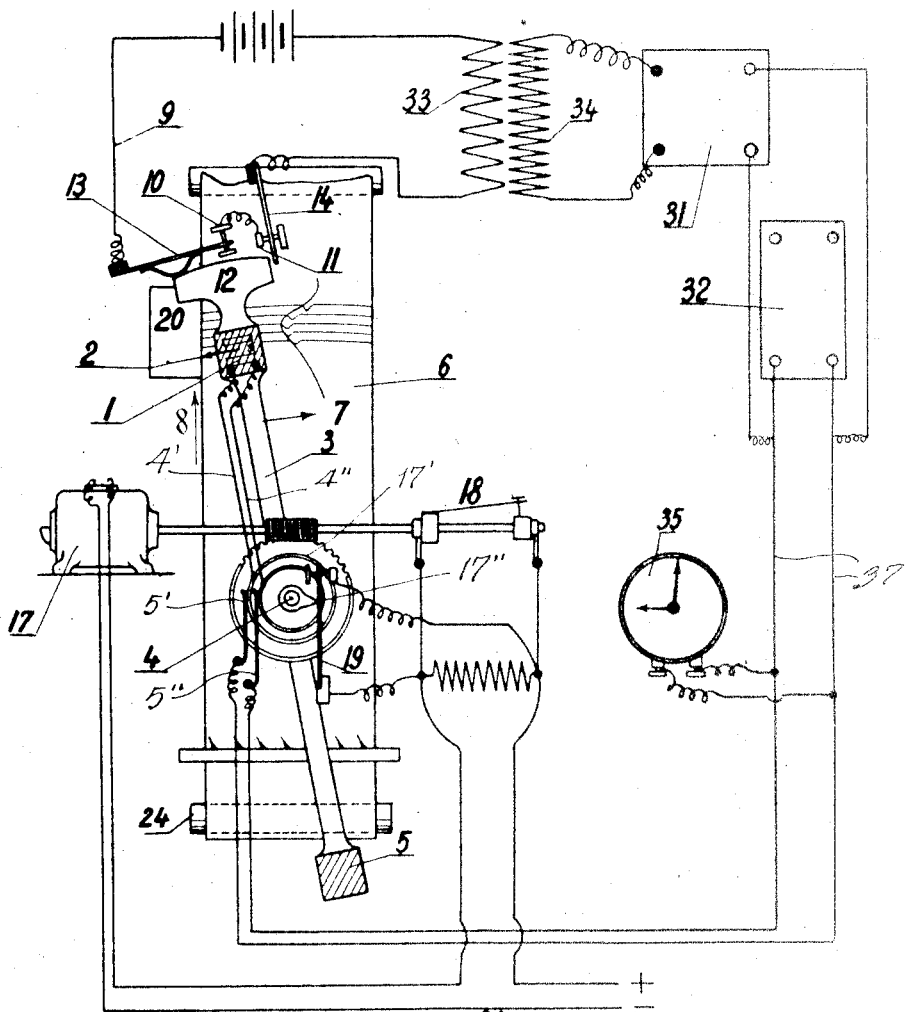

Fig. 6 represents a general front view of a continuous sounding installation using ultra-sounds which comprises a recording apparatus of the continuous type and of great sensitiveness which forms the object of the invention.

An electromagnet 1 connected with a current supply and actuating a recording point 2 is mounted at the end of an arm 3 pivoting on axle 4, said arm being rotated at a uniform speed by means of a suitable device. The electric connections of the electromagnet consist of supple wires 4', 4'' connected with rings 17', 17'' concentric with axle 4 and moving with arm 3; current being supplied to said rings through spring contacts 5', 5'' from an electric receiving circuit actuated at the beginning and end of the phenomenon to be measured.

At the other end of said arm is a counter-weight 5 for balancing the same. At a given moment in its rotation, the recording point comes into contact with a record band 6 whose center line passes through the axis of rotation 4.

The operation of the said device is as follows:

The arm 3 rotates at a high speed which is absolutely constant, in the direction of the arrow 7, and the paper band travels slowly in the direction of the arrow 8. At each passage before the band 8, the point 2 forms a curve approaching an arc, so that the said band will indicate a set of parallel curves which are very close together.

In order that the phenomenon whose duration is to be measured shall take place while the said point travels over the paper-band, the start of the phenomenon is controlled by a contact which is produced by the rotation of the arm 3. A device for such control is shown on Fig. 6 and in a detail view on Fig. 2. It comprises a primary circuit 9, coil 33 of which induces a secondary current in coil 34. In circuit 9 are inserted two contacts comprising one contact 10 which is normally open and another 11 which is normally closed. A cam 12 in insulating material secured to the arm 3 carrying the oscillograph will successively meet with the movable lever 13 of the normally open contact and will close the same, and then a few tenths of a second afterwards, it meets with the movable arm 14 of the normally closed contact and opens the same. The circuit 9, which comprises a source of electric current, is thus closed for a few tenths of a second and is then abruptly opened. The position of the cam 12 on the arm 3 is such that the circuit 9 is broken through opening of contact 11 at the moment when point 2 appears upon the edge of the record band 6 whereby induction current at breaking causes through induction coils 33 and 34 beginning of phenomenon to be measured, such as for instance an emission of sound. The device actuating said phenomenon is diagrammatically shown in 31. A branch receiving circuit 37 leads said current to spring contacts 5', 5'' and thereby to electromagnet. This will form a first indentation 15 (Fig. 1) on the arc-shaped path. All the depressions 15 of the successive arcs are situated upon the same straight line parallel to the edge of the band 6 and adjacent this edge. The end of the phenomenon, for instance return of emission of sound reflected on bottom of sea acting upon device such as a microphone combined with suitable amplifiers diagrammatically shown in 32, will again affect the receiving circuit which acts upon the electromagnet 1 and forms upon its record another depression 16. The depressions 16 of the successive records are situated at variable distances from the starting depressions 15 if the duration of the measured phenomenon varies.

A diagram formed by the apparatus is shown in detail in Fig. 3. The diagram has been completed by connecting by a curve all the indentations indicating the end of the phenomenon. In the present case, this curve represents so to speak the vertical section of the sea according to the course of the vessel. For the rap d reading of the diagram, a comb 50 which is shown diagrammatically comprising teeth 51 which bear upon the band 6, draws upon the latter longitudinal lines corresponding to the average values of the measurement desired. For example, in the case of sounding by means of sound, the said comb will form lines corresponding to the depths 0 metres, 10 metres, 20 metres, 30 metres, etc. The teeth 51 of the comb which correspond to the principal values 0 metre, 50 metres, 100 metres, etc., bear constantly upon the diagram and produce the full lines. The teeth 52 of the comb which correspond to the intermediate values 10 metres, 20 metres, 30 metres, 40 metres, 60 metres, etc., are movable about an axis and are actuated by a cam device 53 which separates them at times from the surface of the band, so that they form discontinuous lines. The scale is thus read with great facility. This comb may be moved perpendicular to the paper, so that the line drawn by the tooth 0 will coincide with the initial point of the starting indentation of the phenomenon. The same result may be obtained with a fixed comb by displacing the contact 11 which effects the starting of the phenomenon (contact 11 Fig. 2) in a parallel direction to the path of the cam which actuates the said contact (cam 12).

It might happen, if the duration of the phenomenon is sufficiently long, that if the starting depression were recorded near the operative edge of the band, the final indentation would be produced when the point had passed beyond the band. To produce the record in this case, one effects (by a suitable displacement of the combination of the contacts 10—11 forwardly of the movement of rotation of the cam 12) the premature starting of the phenomenon, so that the final indentation of the phenomenon shall be recorded upon the band. If the displacement which is given to the contacts is known, one will thus ascertain the amount by which it is necessary to increase the measurement comprised between the zero of the scale and the indentation produced at the end of the phenomenon. For example in the sounding operation, if the width of the band corresponds to 200 metres depth, when one operates at depths of 200 metres the contacts will be displaced by the angle corresponding to 200 metres, so that a sounding operation at 200 metres would form the final indentation of the phenomenon upon the zero line of the scale. For soundings above 200 metres, it will suffice to add 200 metres to the value which is read upon the diagram.

The spacing between two consecutive teeth of the comb is so determined that the time taken by the point 2 to cover its arc between the two lines $a$ $a'$ of the scale formed by the teeth shall be equal to the variation which takes place in the duration of the phenomenon between the values $a$ and $a'$ of the variable which is sought for.

In the case of sounding by means of sound, this displacement will be produced for example by supposing that the velocity of the sound in water is 1500 metres per second. It is known that this speed depends upon certain physical conditions and particularly upon the temperature, the proportion of salt and the pressure, and thence upon the depth. If the conditions are such that the speed of the sound which is to be adopted is very different from 1500 metres, the spacing of the comb teeth should be changed, in principle, but to obviate this one may employ the arrangement shown in Fig. 4. The electromagnet is mounted on slides 3' borne by arm 3 and can be fixed through means of adjusting screws 3''. Of course the current is always fed to electromagnet in any position through supple wires 4', 4''. One sees the distance to axle 4 of point 2 can be varied at will and thereby the length of arc described by said point in a unit of time varies as required. One can thus arrange the device so that this length, measured between the lines drawn by the comb, shall correspond to the indications of the graduations of the comb for the values of the velocity of the sound which differ from 1500 metres. To make this correction, a small scale 20 having arcs which are marked for example 1490 metres, 1500 metres, 1510 metres, is disposed adjacent the edge of the band 6 and the inoperative position of the point will be determined with reference to this scale according to the velocity of the sound in the medium in question.

In order that the diagram shall be complete, it is necessary to check up the time at proper intervals, so as to be enabled to ascertain the moment corresponding to each measurement, when this is required. For instance a watch 35 closes, every five minutes, a circuit shunting off the branch receiving circuit feeding the electromagnet. Thus the recording point 2 whilst passing over the band 6 is almost absolutely undeflected and the arc which it inscribes upon the band during this revolution will be displaced for this reason. Since the point has returned to its normal position during the following revolution, it is observed that the two circular arcs thus formed will not have the normal spacing of the other arcs and for this reason a black band, such as 22 will appear upon the sheet serving as a check for the time. It is simply necessary to inscribe by hand from time to time upon the sheet the exact time of one of these check marks in order to subsequently find with facility the exact time for all the others and consequently of all the measurements should this be required.

The arrangements concerning the paper band are as follows (Fig. 5):

The said band 6 is wound on a reel 23. It passes over a guide roller 24 and upon an adjustable holding piece 25 which places it under the pen of the electromagnet 1, and it then proceeds upon an entraining roller 26 upon which it is pressed by the rollers 27. This roller is set in motion by an adequate connection (not shown) with the motor which effects the rotation of the arm 3 carrying the elctromagnet. One may also connect this roller, in the case of a continuous sounding by acoustic waves, with the engine of the vessel itself or with a log so as to obtain an unwinding of the paper band which is proportional to the distance covered by the ship.

The paper band 6 is covered with lampblack between the rollers 23 and 24 by means of an oil lamp 36 which at regular intervals is automatically caused to move under this length of the band, these intervals being regulated so as to be somewhat below the time taken by a given point on the band to pass from the roller 23 to the roller 24. After passing over the entraining roller 26, the band proceeds upon a fixed table 28 which serves as a support whereby it may be examined and may receive all the necessary indications. The said band then passes into the vessel 29 containing an alcoholic solution of shellac for fixing upon the paper the lampblack and the records received by the band. The band is finally wound upon a reel 30 after having been dried during its travel between the discharge end of the vessel 29 and the roller 30. Obviously, the record sheet may in certain cases be inscribed by a pen or a pencil, and in this case the arrangements of the band will be simplified.

In general, the rotation at constant speed of the arm 3 carrying the electromagnet 1 will be obtained by an electric motor 17; the speed of the motor may be regulated by a regulator 18 formed by a spring strip situated parallel with the shaft of the motor 17 and having at its outer end a contact piece which under the action of centrifugal force will successively open and close a contact which varies the resistance of the supply circuit of the motor, so as to bring the speed of the latter to a constant value which is determined in advance. The said electric contact is operated very frequently in a unit of time.

This will produce phenomena of electric induction upon the circuit of the electromagnet which might disturb the operation of the latter. In order to obviate this inconvenience during the period in which the electromagnet passes before the record band, one disposes on the shaft 4 of the apparatus a contact piece 19 which short-circuits the regulator 18 of the electric motor during this time. One thus obviates phenomena of induction during the recording operation. On the contrary, this will produce a slight acceleration of the arm carrying the oscillograph, but this error is absolutely negligible.

What I claim is:

1. In an apparatus for recording the duration of a series of very brief phenomena on a moving record band the combination of recording means, of means for moving the recording means transversely over the record band in a direction substantially perpendicular to that of the movement of the said record band, the movement of the recording means over the band beginning slightly before and ending slightly after the beginning and end of each individual phenomenon, and of means whereby the recording means are moved in the direction of the movement of the band at the exact moment of the beginning and of the end of the phenomenon.

2. In an apparatus for recording the duration of a series of very brief phenomena on a moving record band the combination of recording means, of means for moving the recording means at a speed higher than the speed of the record band and transversely over said record band, in a direction substantially perpendicular to that of the movement of the said record band, the movement of the recording means over the band beginning slightly before and ending slightly after the beginning and end of each individual phenomenon, and of means whereby the recording means are moved in the direction of the movement of the band at the exact moment of the beginning and of the end of the phenomenon.

3. In an apparatus for recording the duration of very brief phenomena comprising recording means and a movable record band, the combination of an equilibrated pivoting arm carrying said recording means and the axis of rotation of which is perpendicular to said band, of means for rotating said arm adapted to make the recording means move at a constant speed higher than the speed of displacement of said band, and of means for actuating said recording means at the beginning and at the end of the phenomenon whilst the recording means passes in front of the record band.

4. In an apparatus for recording the duration of very brief phenomena comprising recording means and a movable record band, the combination of means for moving said recording means transversely with reference to said band at a speed higher than the speed of said band, and of means actuated by the rotation of the said arm and effecting the starting of the phenomenon at the moment when the recording means passes in front of a longitudinal line drawn on the record band.

5. In an apparatus for recording the duration of very brief phenomena comprising recording means and a movable record band, the combination of means for moving said recording means transversely with reference to said band, at a speed higher than the speed of said record band, of an electric contact actuated by the movement of the recording means and effecting the starting of the phenomenon and of means for displacing said contact by a given amount.

6. In an apparatus for recording the duration of very brief phenomena and chiefly for sounding operations by vibrating waves, comprising recording means, and a movable record band, the combination of means for moving said recording means at a speed higher than the speed of displacement of said record band and transversely with reference thereto, of a cam on the said arm, of a first electric contact normally open and of a second electric contact normally closed, the two contacts being disposed in series in the primary circuit of the induction coil of the apparatus emitting the vibratory waves and being actuated by the cam in quick succession.

7. In an apparatus for recording the duration of very brief phenomena comprising recording means and a movable record band, the combination of an equilibrated pivoting arm to which is slidably secured said recording means, the axis of rotation of said arm being perpendicular to said band, of means for rotating said arm and adapted to make the recording means move at a constant speed higher than the speed of said record band and of means for actuating said recording means at the beginning and at the end of the phenomenon whilst the recording means passes in front of the record band.

8. In an apparatus for recording the duration of very brief phenomena comprising recording means and a movable record band, the combination of an equilibrated pivoting arm carrying said recording means and the axis of rotation of which is perpendicular to said band, of an electric motor controlling said arm, of a speed regulator for said motor constituted by centrifugal contacts disposed in shunt connection with the feed circuit of said motor and adapted to vary the resistance of said circuit and of a contact mounted on the axis of said arm and adapted to short circuit the centrifugal contacts whilst the recording means passes in front of the record band.

In witness whereof I have hereunto set my hand.

PIERRE AUGUSTE DANIEL MARTI.